United States Patent
Lewis et al.

(10) Patent No.: US 7,529,757 B2
(45) Date of Patent: May 5, 2009

(54) DECOMPOSITION OF TASKS INTO EXTENSIBLE AND CUSTOMIZABLE BUSINESS ACTIVITIES

(75) Inventors: Elliot S. Lewis, Seattle, WA (US); Israel Hilerio, Kenmore, WA (US); Sergey Sorokin, Richmond (CA); Jigar Thakkar, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 468 days.

(21) Appl. No.: 11/020,585

(22) Filed: Dec. 22, 2004

(65) Prior Publication Data

US 2006/0136918 A1 Jun. 22, 2006

(51) Int. Cl.
*G06F 7/00* (2006.01)
*G06F 17/30* (2006.01)

(52) U.S. Cl. .................. 707/100; 707/1; 707/200; 705/1; 705/8; 705/9

(58) Field of Classification Search .............. 707/1, 707/100, 200; 705/1, 8–9
See application file for complete search history.

(56) References Cited

U.S. PATENT DOCUMENTS

| | | | | |
|---|---|---|---|---|
| 7,013,284 B2* | 3/2006 | Guyan et al. | .............. | 705/9 |
| 7,219,327 B1* | 5/2007 | Jacobs et al. | .............. | 717/104 |
| 2004/0133587 A1* | 7/2004 | Matsumoto et al. | .............. | 707/102 |
| 2005/0010549 A1* | 1/2005 | Gockel et al. | .............. | 707/1 |
| 2005/0050155 A1* | 3/2005 | McGee et al. | .............. | 709/213 |
| 2005/0060371 A1* | 3/2005 | Cohen et al. | .............. | 709/205 |

OTHER PUBLICATIONS

Rosson, Mary Beth, "Integrating development of task and object models", Communications of the ACM; Jan. 1999, vol. 42 Issue 1, p. 49-56, 8p. Download: http://zj5lm7ny2a.search.serialssolutions.com/directLink?&atitle=Integrating%20development%20of%20task%20and%20object%20models&author=Mary%20Beth%20Rosson&issn=00010782&title=Association%20for%20Computin.*
Zdun, U., "Using split objects for maintenance and reengineering tasks", Software Maintenance and Reengineering, 2004. CSMR 2004. Proceedings. Eighth European Conference on (1534-5351), p. 105. Download: http://ieeexplore.ieee.org/stamp/stamp.jsp?arnumber=01281411.*

* cited by examiner

*Primary Examiner*—John E Breene
*Assistant Examiner*—Hares Jami
(74) *Attorney, Agent, or Firm*—Marshall, Gerstein & Borun LLP (57) ABSTRACT

A method for organizing task data used in customer relationship management systems in which task data is decomposed into a set of business activity classes including a set of business task classes, where the business task classes are combined through association or multiple inheritance to create the business activity class. Each task class can be further decomposed into a base task class and a set of task characteristic classes where task definitions may be modified by associating additional task characteristic classes to the base task class.

16 Claims, 12 Drawing Sheets

Figure 1

TASK DATA

- Customer Name
- Customer Contact Info
- Authorization code
- Request Parameters
- Phone Number
- Fax Number
- Email
- Document Type
- Document 1 Data
- Document 2 Data
- Document 3 Data
- Fax Data Recipient
- Fax Data Sending Party
- Fax Data Subject
- Fax Data Message
- Fax Data Send Time
- Fax Data Receive Time
- Email Header 1
- Email Header 2
- Email Recipient Data
- Email Body Data
- Phone call schedule time
- Phone call receive stamp
- ...
- ...

DECOMPOSITION OF TASKS INTO EXTENSIBLE AND CUSTOMIZABLE BUSINESS ACTIVITIES

FIELD OF THE INVENTION

The present invention generally relates to methods of organizing data in a customer relationship management system.

BACKGROUND

Current Personal Information Management (PIM) systems and Customer Relationship Management (CRM) systems use a static data model in which business tasks are predefined during CRM system design time and are realtively fixed once the system is created. Consequently, business task data is usually organized and stored as fixed, stand-alone data structures comprising all necessary attributes of a business task as conceived at design time. The problem with fixed, stand-alone data structures is that they are inflexible and do not allow for modifications to the task structure after design time and they do not account for views for task data that are inconsistent with the predefined task model.

Figure 2:
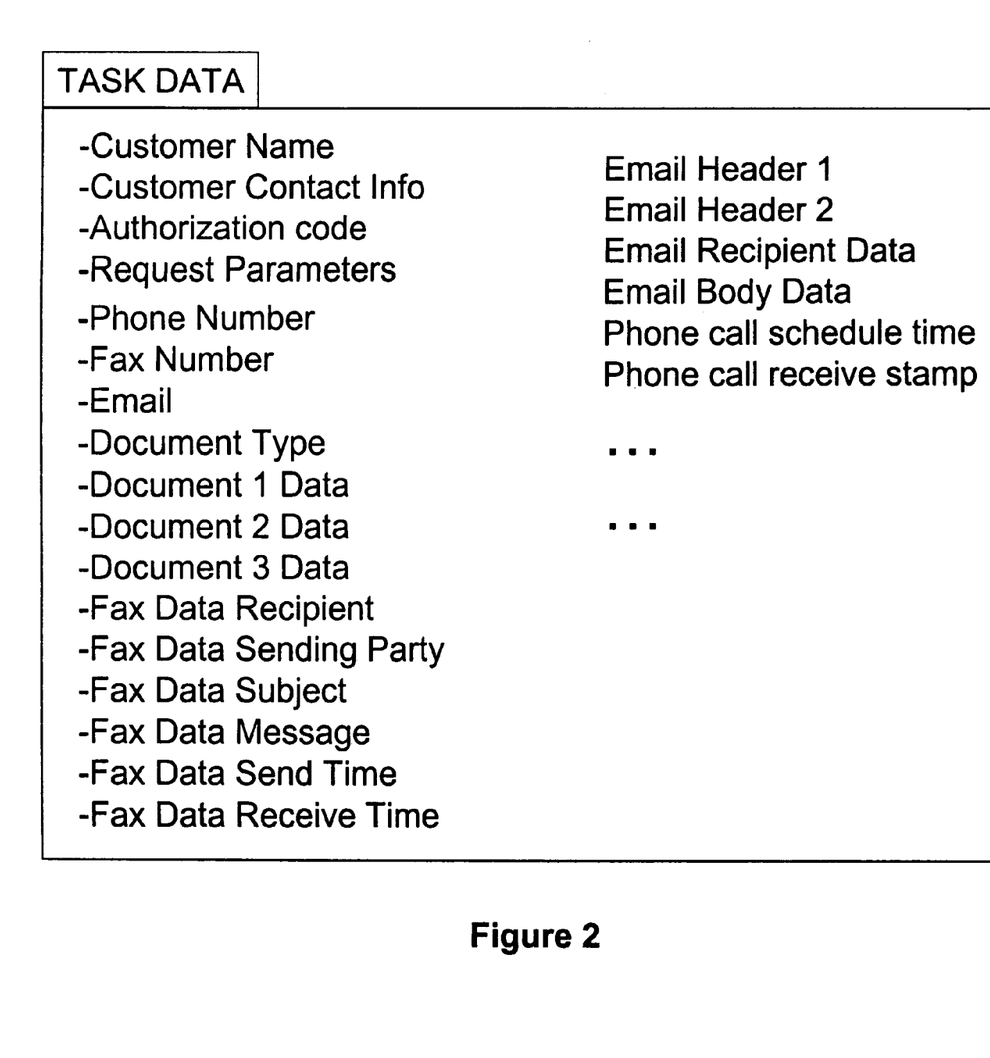
FIG. 2 illustrates a generic task data structure used in prior art systems.

FIG. 2 shows a CRM data structure used in existing systems. The data structure corresponds to a generic task that is defined to contain all information necessary to perform a task, e.g., fax information, email information, customer information, and document information. This task structure makes it easy to query for a result set comprising the entire task structure as defined, i.e., querying to return all fields of the entire task based on some attribute of the task. However, on inspection of the generic task structure, several subcategories of tasks can be easily discerned, e.g., faxing, e-mailing, new customer creation, document creation, etc. Each of these subcategories of information may be thought of as separate tasks, or subtasks. Consequently, users of CRM systems often desire a view of task data in which the displayed result set is actually a subtask of the generic task, as defined by the existing task data model. Additionally, users may desire to view a subtask based on another subtask. For example, a desired view could be a result set listing all faxes to be sent out that relate to proposal documents. In this case, the user desires a view of all fax tasks having an association to a document task. While a result set can be created from the existing generic task structure through database querying, such queries are complex and resource consuming, even with the aid of category and sub-category fields used by some CRM systems to demarcate their data subsets.

In addition to viewing subtasks of a main task structure, CRM users may also desire the ability to customize an existing task or subtask. For example, a fax subtask may currently have only a set of headers that were included with the fax subtask at design time. CRM users may want to add additional headers, or include a customized fax cover. The CRM users may also want this modified fax subtask as an additional fax task definition while retaining and using the original fax task definition.

Existing fixed, stand-alone data structure models fail to address the issue of capturing new task data at runtime or creating new task views based on existing task data. One means presented in prior art systems for providing flexibility to the existing data models is to create reserve parameters and attributes in the existing data structures for future use. While this reservation strategy may allow for some future customization, it is limited by memory considerations because each allocated, but unused, parameter of an instance of a data structure is wasted memory space.

Another problem of fixed stand-alone data structures is that as the functionality of CRM systems increases and new tasks are added to each new CRM version, the existing data structures grow to be immensely large and complex, because they are designed to contain every necessary data category in a single-entity data structure. Managing such huge data structures consumes a large amount of processing capacity because the amount of parsing and formatting required to return a specific result set (or view) is commensurate with the size of the data structures.

Therefore, there is a need for an improved data model for CRM systems for storing and organizing task data in a more efficient and extensible manner than is currently offered.

The claimed method and system provides a data organization process for use in a customer relationship management (CRM) system where task data is decomposed into a set of task objects defined, in part, by a base task object. The task objects may be combined to form various business activity objects defined by a common task object, or index task object. Each task object can be further modified by combining a set of task characteristic objects with the base task object. The combinations of objects may be performed using associations created during operation of the CRM system.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
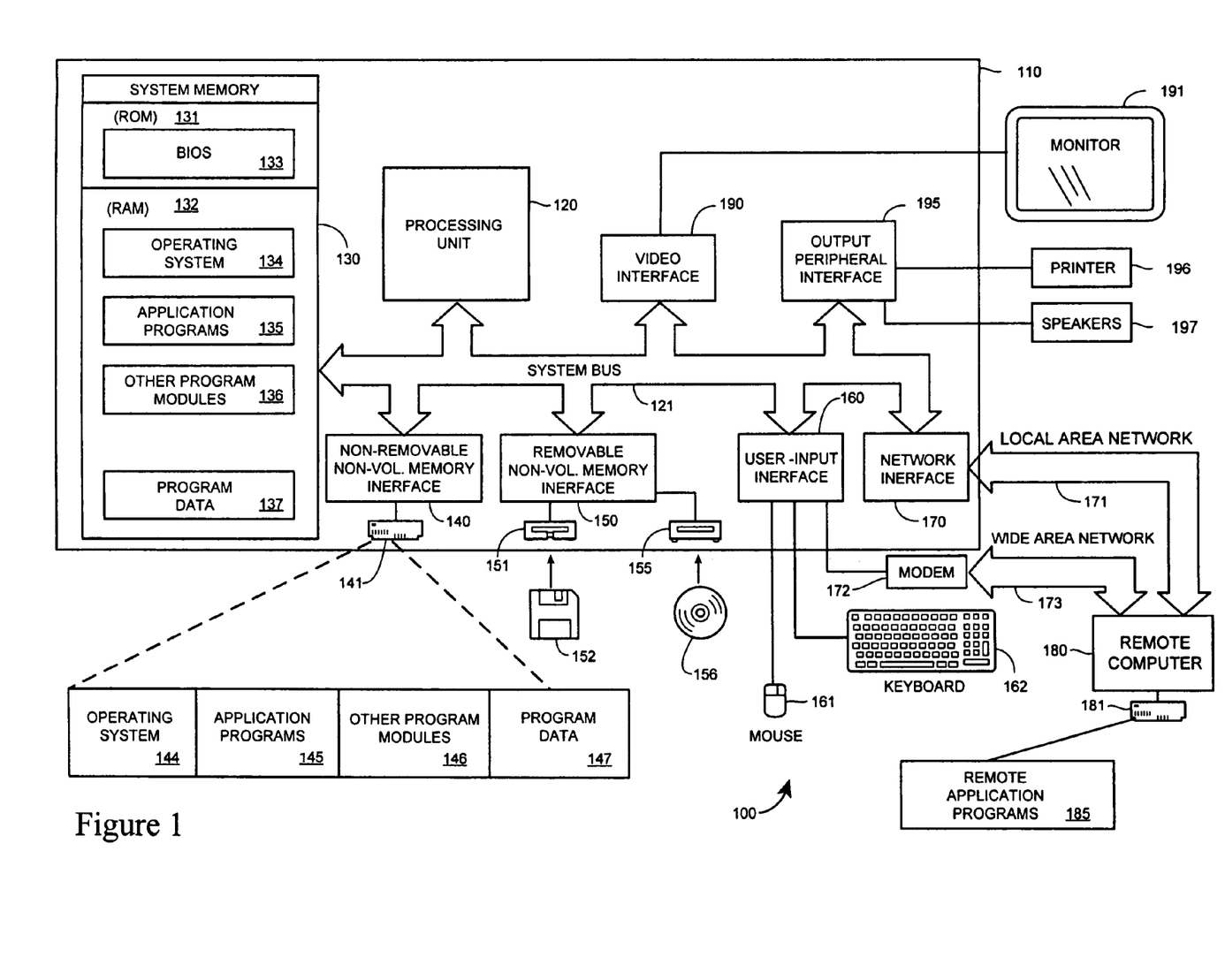
FIG. 1 illustrates a block diagram of a computing system that may operate in accordance with the claims.

FIG. 1 illustrates an example of a suitable computing system environment 100 on which a system of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

Figure 3:
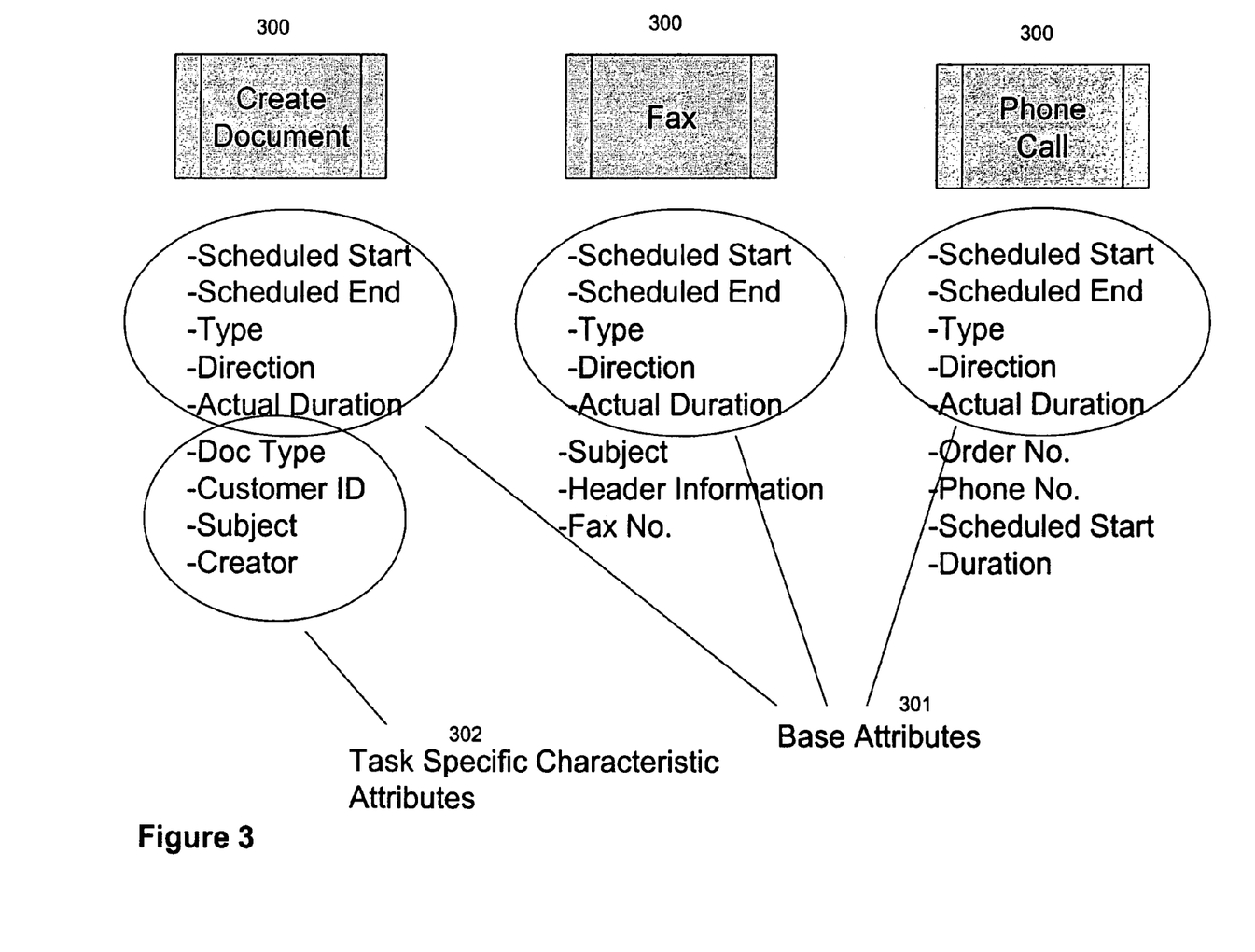
FIG. 3 illustrates task structures having a set of common base attributes that are combined with task specific characteristic attributes.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a FIG. 3 illustrates a decomposition of task classes 300 into a set of base attributes 301 and a sct of task specific characteristic attributes 302. The base attributes in this embodiment include scheduled start, scheduled end, type, direction, and actual duration attributes. Although this set of attributes does not itself define any complete task, each task in the model comprises this base set of attributes, and thus the set of base attributes 301 may be encapsulated into a base class from which all other tasks sub-class their implementation. A usable, task class requires combining a base task class with an additional set of attributes that define the characteristics of a fundamental task. For example, a particular task class such as a fax class may be formed by associating an object containing fax specific attributes to the base task class. In this model, each fundamental task will inherently have the base attributes contained in its structure along with a characteristic set of attributes. An object and a class are generally interchangeable terms as described herein. Thus, descriptions herein that discuss or describe a class, such as a base task class, also describe an object of the class, such as a base task object. communications link between the computers may be used.

Figure 4:
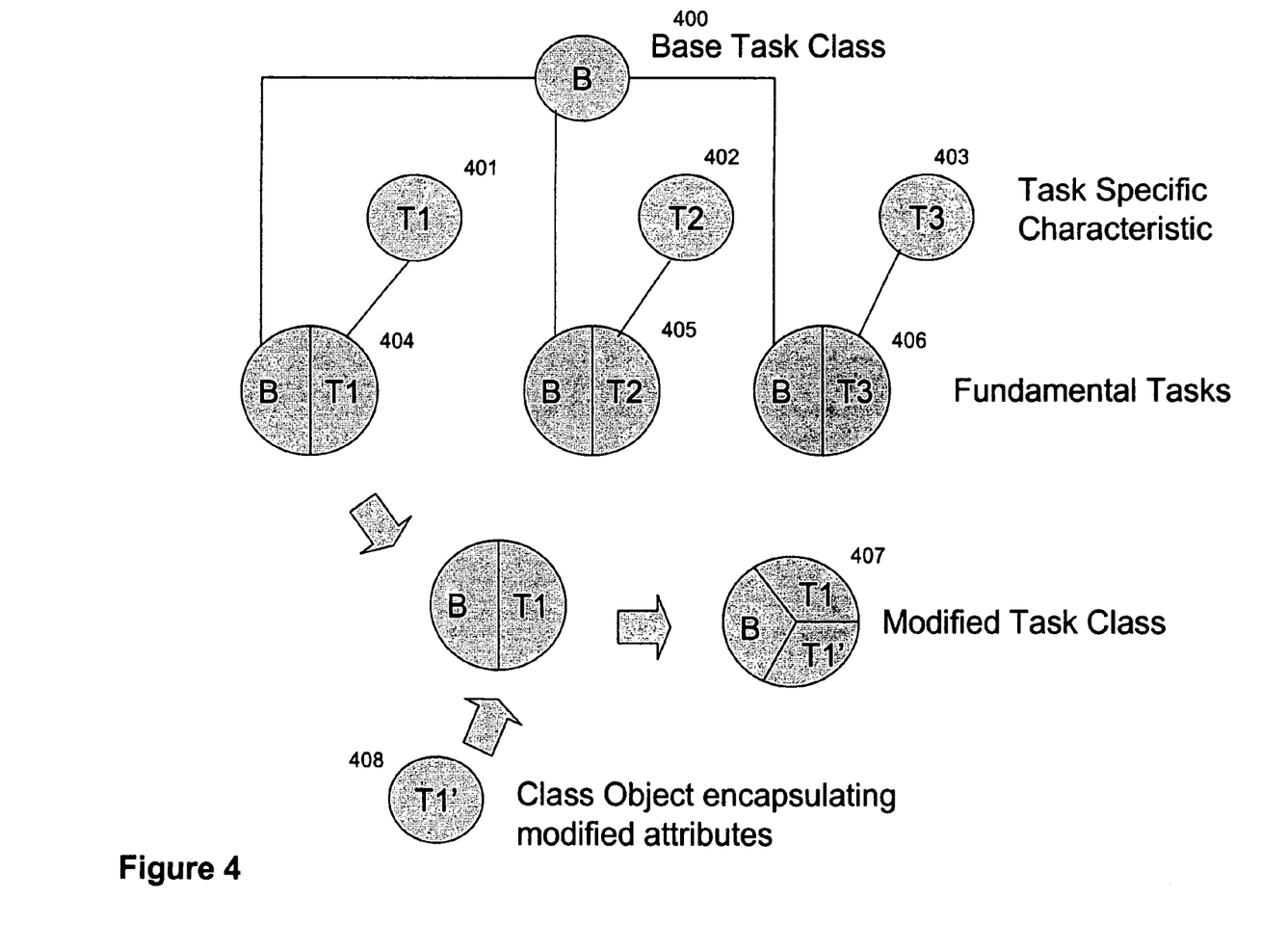
FIG. 4 illustrates the formation of a fundamental task class and a modified task class.

FIG. 4 illustrates that a base task class 400 may be combined with task characteristic classes 401, 402, 403, to form fundamental task classes 404, 405, 406. FIG. 4 further illustrates that while fundamental task classes such as 404-406 may be provided out-the-box, a fundamental task 404 of the claimed system may be modified to produce a new version of the fundamental task 407 by further associating another characteristic class 408. No matter how many additional associations are added to the original base task class, each new aggregation can be linked back to its base task and fundamental task, or any associated class in the composition. Thus, this data model enables a CRM system to create, ad hoc, any new task type by simply associating a base task class to a set of characteristic task classes.

Figure 5:
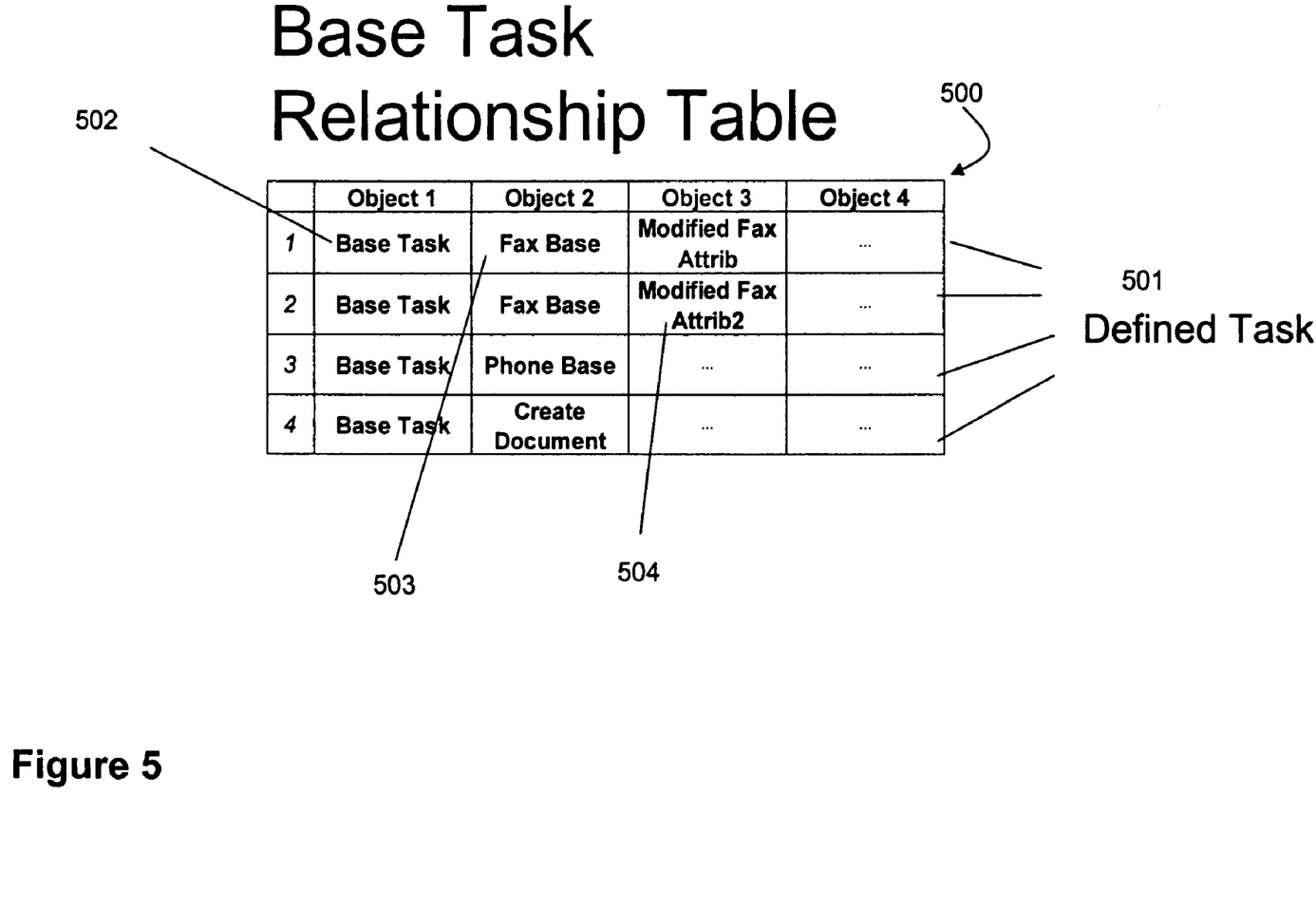
FIG. 5 illustrates a relationship table used to capture the association of the task classes of FIG. 4.

FIG. 5 illustrates a data model table 500 for capturing the definition of task classes. Each row of the table 500 may correspond to a task definition. Each row may have a base task entry 502 followed by a characteristic class entry 503 for characterizing fundamental task classes such as fax, phone, document creation, etc. FIG. 5 further illustrates that each fundamental task class 502-503 may be modified, ad hoc, to create a specialized task class based on the fundamental task class by creating additional characterizing attributes, encapsulating those attributes into an object 503, and associating the object with the fundamental task class. In this manner, CRM users may now customize each task structure, even after design time, using the claimed method and system. Furthermore, because every defined task, including newly modified tasks, are built upon associations, searches can be made to extract any superset of tasks, based on those associations. For example, a search of user fax tasks may now turn up both the fundamental task structure as well as modified fax structures (used for special customers) based on an association.

Figure 6:
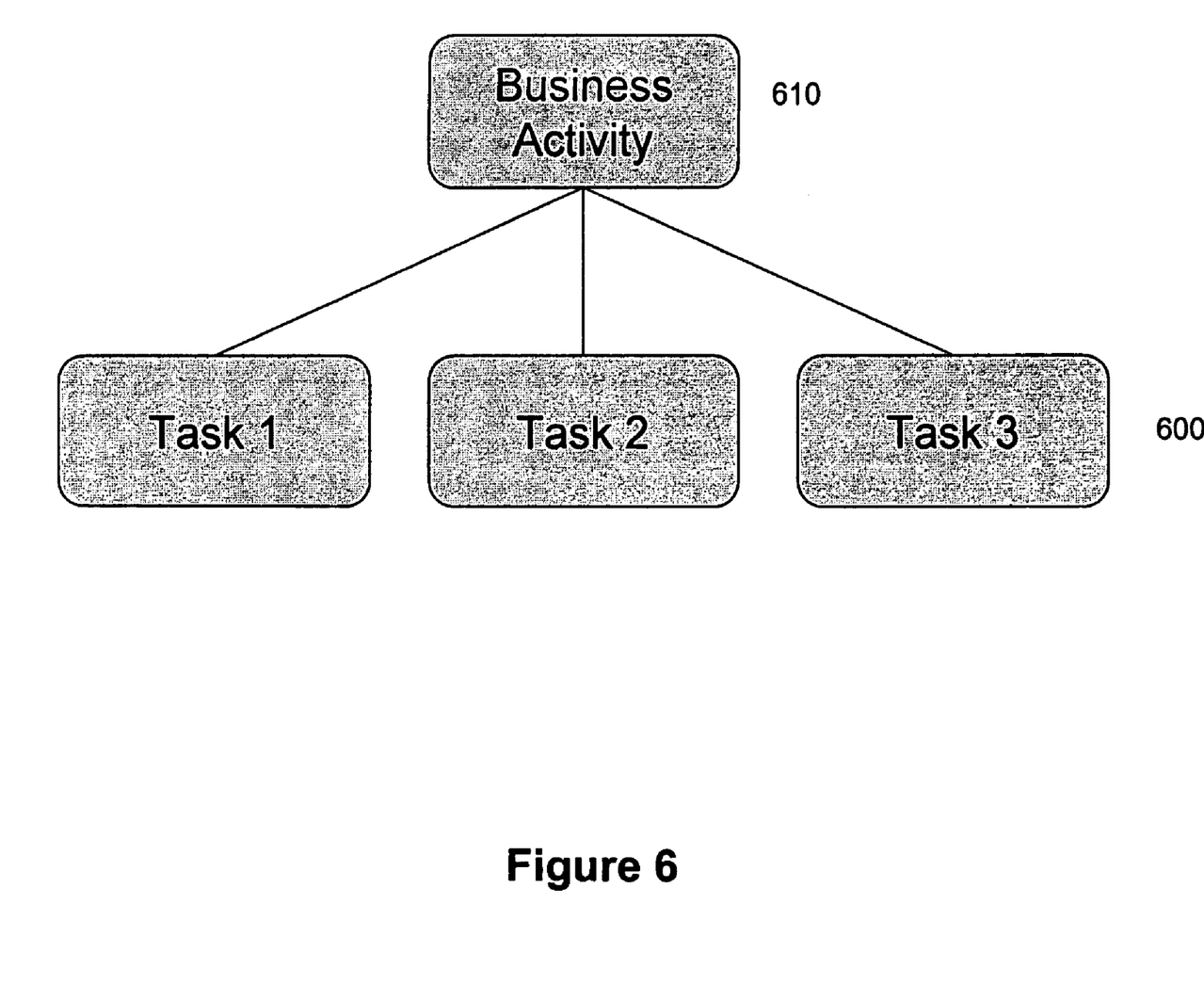
FIG. 6 illustrates the relationship between a business activity and a set of task classes in an embodiment of the present claims.
Figure 7:
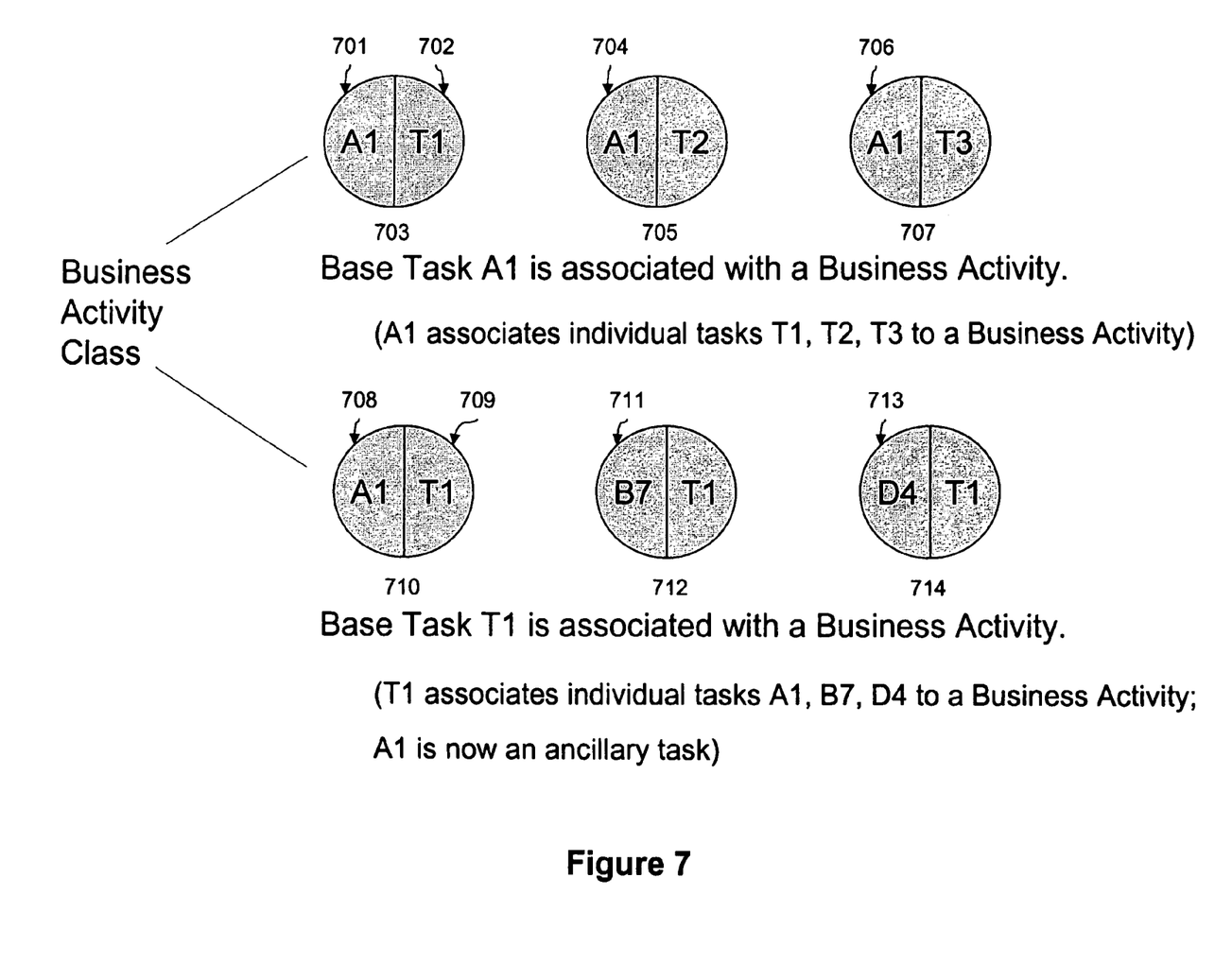
FIG. 7 illustrates an example of a business activity entity and its corresponding set of objects.

FIG. 6 illustrates a macro-level data model that may be used in an embodiment of the claims. The data model conceptualizes business tasks as a set of fundamental tasks 600 associated with a business activity 610, where each business activity may be broken down into a set of tasks. By decomposing tasks in this manner, any desired business activity 610 may be formed, ad hoc, by essentially combining one or more tasks 600. This provides flexibility not shown in prior art systems. Moreover, as will be discussed further below, this data model may allow for task data to be stored in a memory efficient manner that increases processing efficiency because the task data is divided into tailored portions which can be FIG. 7 illustrates the organization of a set of objects that may represent a set of task classes and business activity classes. Associating at least two business assembled at runtime based on user requests. task class objects, e.g., 701 and 702, may create the business activity class 703. Therefore, for any set of class objects that share a common task class, that set of class objects may belong to a business activity associated with the common task class, or index task class. As shown in FIG. 7, what is an ancillary task class 702 in relation to one business activity 703 maybe an index task class 709 for a different business activity, e.g., 710, 712, and 714. Additionally, because objects may be instantiated based on a task class or business class, there may be data entity segregation which allows attributes of specific instances to be modified without affecting the data in other task class objects or business activity objects that share common class parameters. As discussed above, an object and a class are generally interchangeable terms as described herein and thus, descriptions herein that discuss or describe a class, such as a base task class, also describe an object of the class, such as a base task obect. Using an index task class to define a business activity class made up of a set of task classes may provide an efficient means to organize views of data because any task class may be designated an index task class for the purposes of deriving a specific view.

FIG. 7 may be used to explain an example of a business activity for generating a customer proposal. The business activity objects 703, 705, and 707, and index task class, A1 701, may define the activity of generating a proposal. T1 702 may be a class relating to a fax task, T2 704 may be a class relating to an e-mail task, and T3 706 may be a class relating to the task of checking a customer's credit. A CRM user may then desire a listing of all faxes that must be processed. In such a case, the business activity may now involve the fax task. All ancillary tasks associated with the fax task class may now be the subject of interest and may be represented in FIG. 7 by 710, 712, and 714, where T1 709 illustrates a fax associated with the generate a proposal business activity 710, and two other fax tasks where 712 may be a fax related to opening a new account, and 714 may be a fax relating to a client inquiry.

Figure 8:
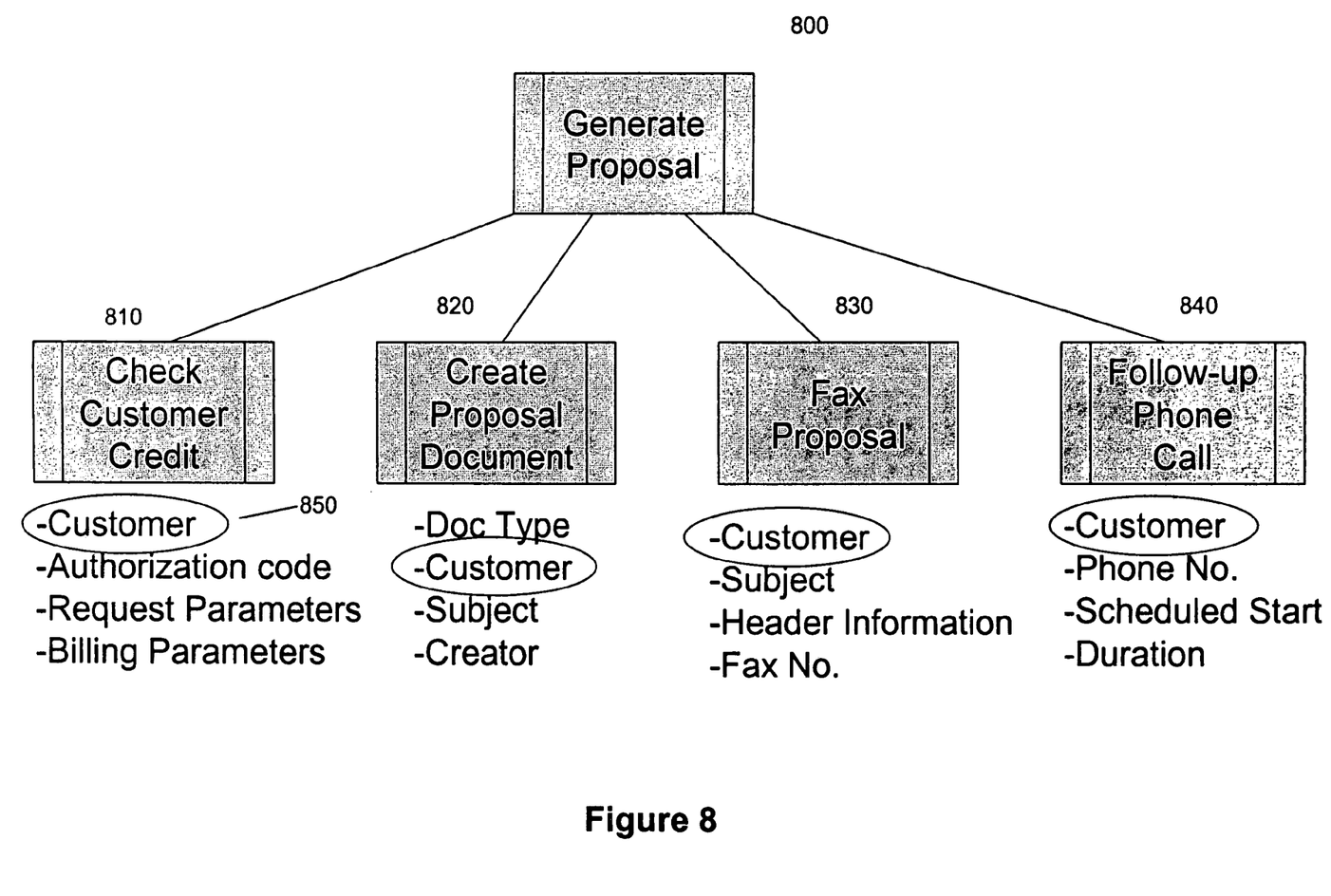
FIG. 8 illustrates the use of a customer class as an index class between business activity objects and task objects.

There may exist overlaps between task specific functions and other CRM functions in a CRM system. While the described embodiments focus on task objects, the system and method of the claims may also be used to associate other types of functional objects. As shown in FIG. 8, the business activity called Generate A Proposal 800 may include a set of tasks 810-840. Each task may be related to a particular customer 850, and thus, a possible set of common parameters may be customer name, customer id, and customer information. These common parameters may be encapsulated into a separate class object and while a customer is not a task, the customer object may also be associated with a set of task classes, thereby relating the task classes to a business activity involving the customer object. Thus, a business object other than a task object may act as an index object. For example, a single instance of a customer object may have several tasks associated with it in the same manner that the task class object may act as an index object in the embodiments above.

Figure 9:
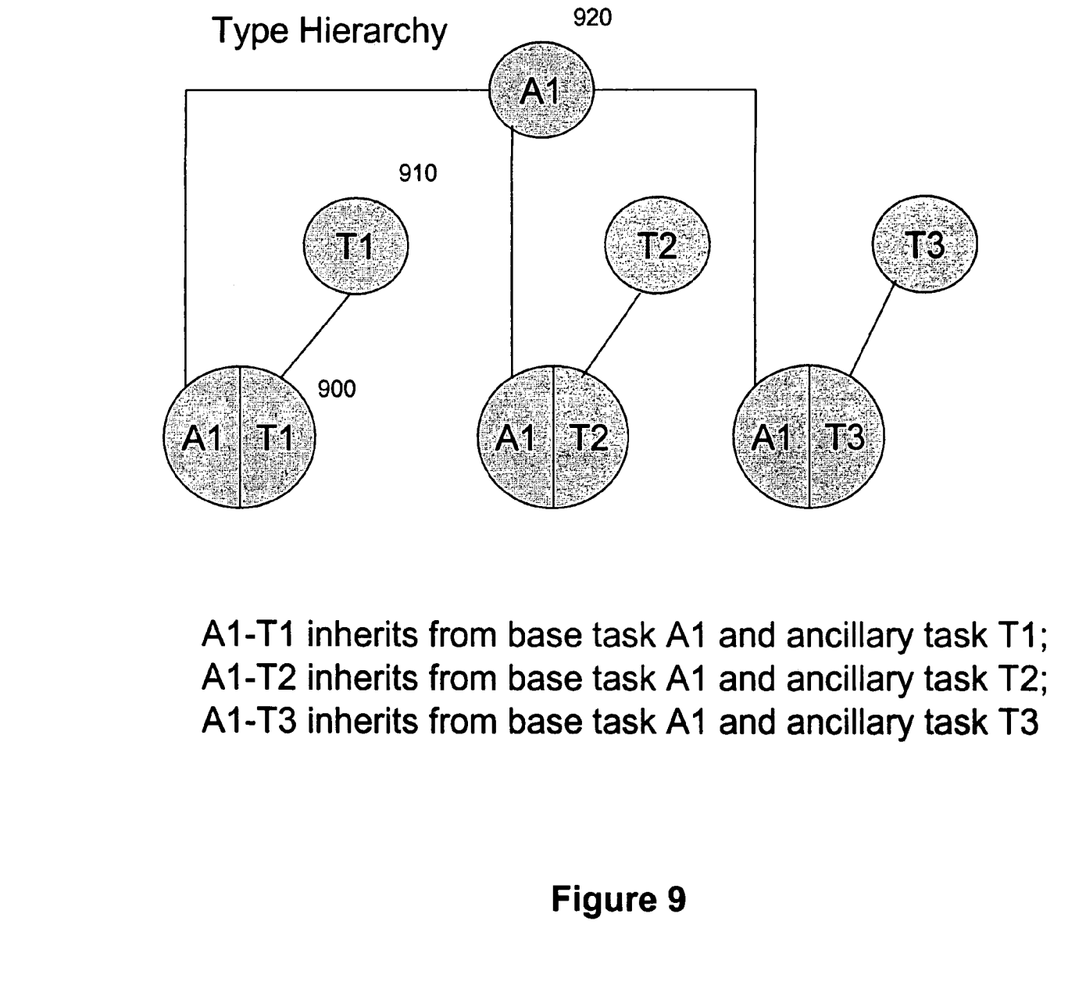
FIG. 9 illustrates a type hierarchy of business activity objects and task objects showing inheritance.

The data model used in the embodiments above may be represented by a type hierarchy, as shown in FIG. 9, in which a business activity 900 is a subclass of a business task, 910 or 920, the business task being a superclass from which business activities subclass their implementation. In this implementation strategy, each business activity class 900 may inherit the parameters of a set of task classes, 910 and 920, the task classes being superclasses of the business activity classes. This form of inheritance is sometimes referred to as multiple inheritance.

Alternatively, the data model may be implemented using relationships, or associations, in which a business activity is formed not by inheritance, but by association of two or more objects. These relationships may be implemented using parameters in the class structure, containing data on the relationship structure, or by using relational tables as shown in FIG. 10.

Figure 10:
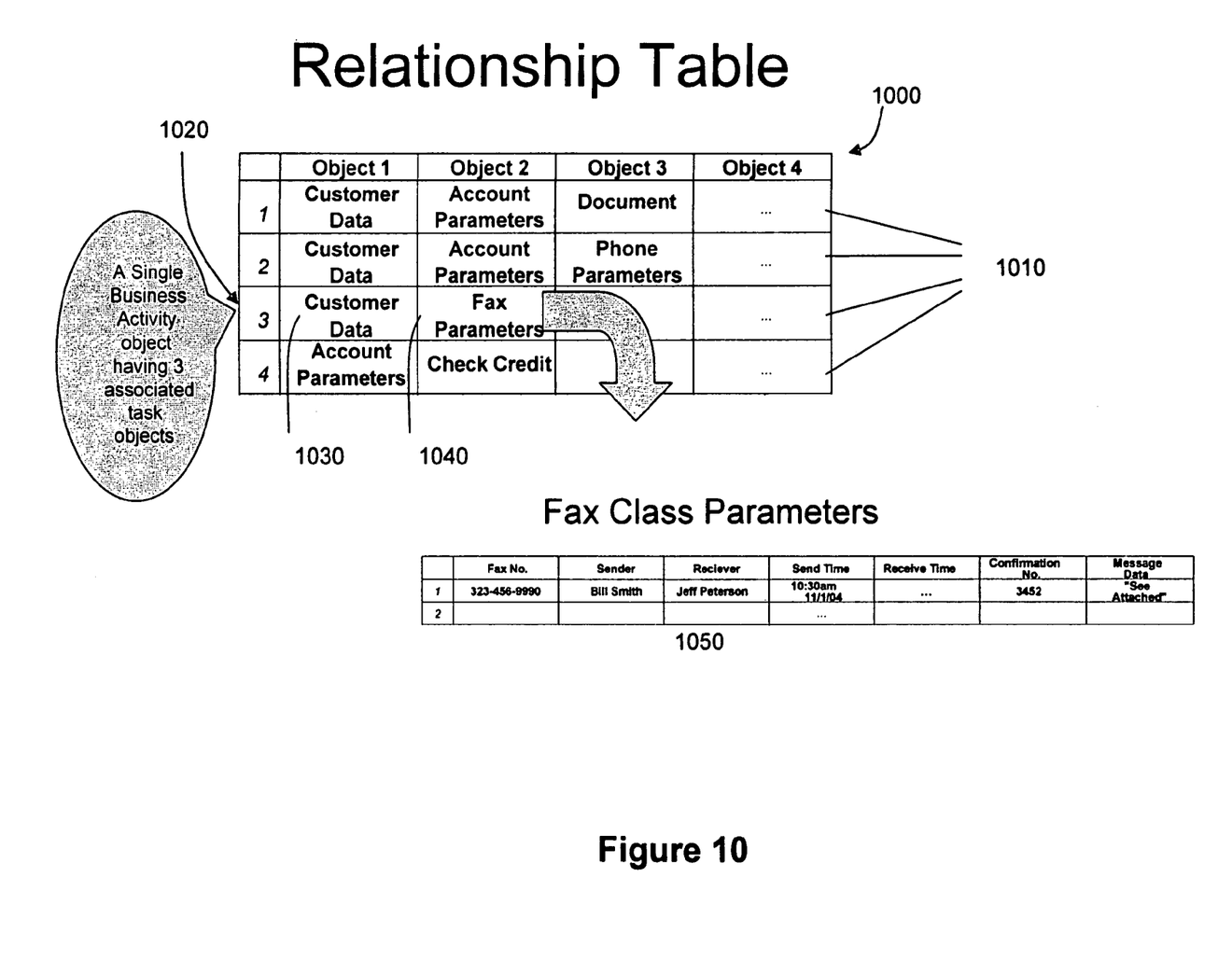
FIG. 10 illustrates a view of a database table showing associations between task objects forming business activity objects.

FIG. 10 illustrates a database table 1000 where the relationships between task class objects may be represented in a row 1010 of the table. In row 1020 of table 1000, for example, a business activity class may be defined as an association between a customer class 1030 and a fax class 1040. The business activity for this business activity class may be the Generate A Proposal example described above. In this case, the index class may be the customer class 1030. FIG. 10 also illustrates that each class may contain its own set of attributes, as shown in the composition of the fax class table 1050. While not specifically shown in FIG. 10, each task class may be further captured, with its base class attributes and characteristic class attributes, in a single relationship table, or can be broken down into a business activity table which references a task definition table, as illustrated in FIG. 5. These tables may be created using relational databases and query statements (such as SQL) that are well known in the art. Furthermore, because of the nature of the organization of the task data by association of business tasks, the present embodiment may provide much easier database management because much of the data views are enabled by existing tables rather than unions and merges created solely through SQL merge queries. This may save processing time on the back-end database, while also providing ease of development for database administrators because less time is spent anticipating task views and creating and managing complicated queries.

Figure 11:
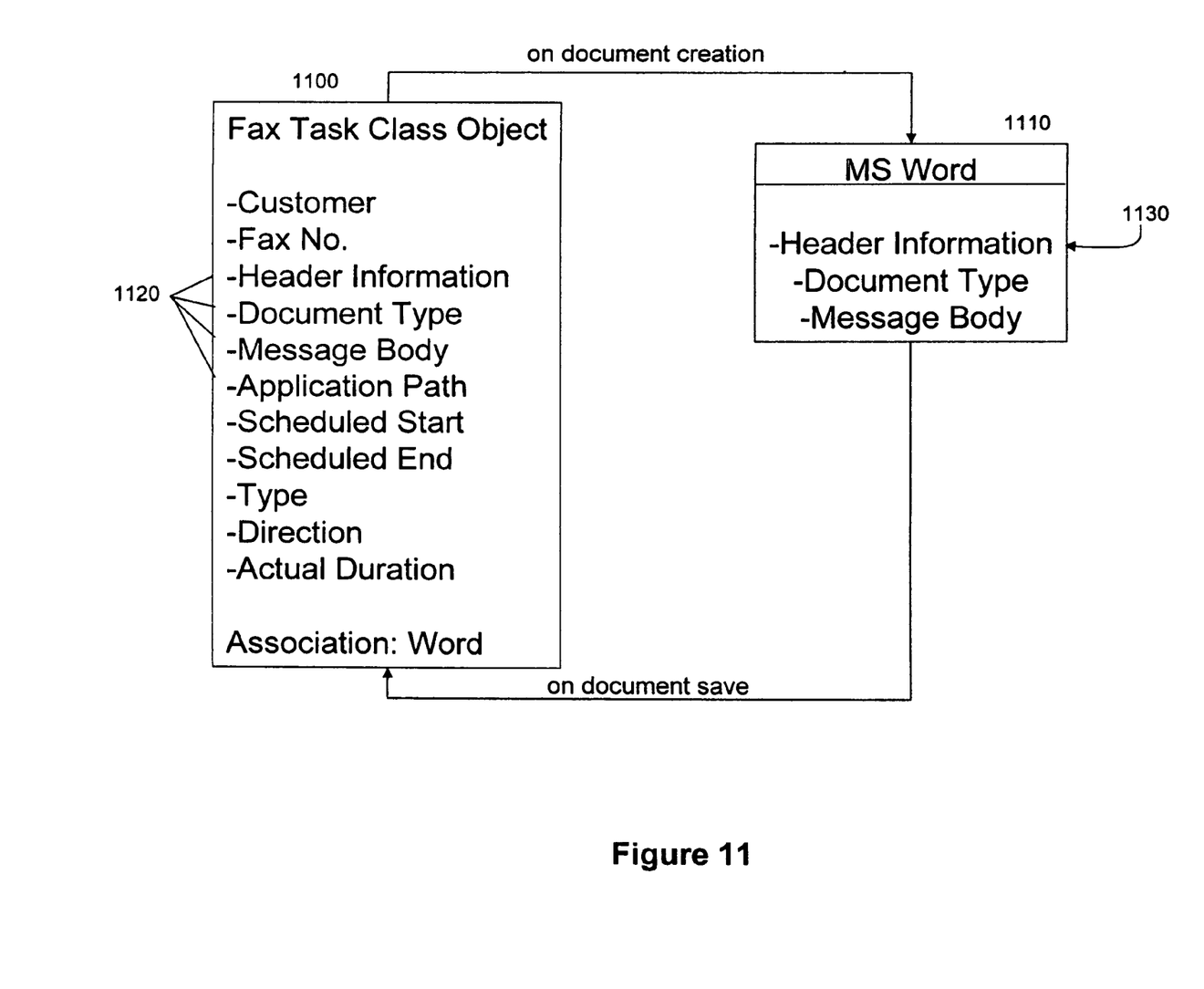
FIG. 11 illustrates an association of a task class and an application.

FIG. 11 may illustrate an enhanced data model embodiment of the present claims. In this enhanced data model, the business task 1100 may be further defined by an application 1110 necessary to execute the task, where each task class may be associated with a specific application used to carry out the task. This association may require a set of parameters 1120 which link the application 1110 to the task class 1100. These link parameters 1120 may provide data for locating the application and for activating the application. These link parameters may also provide a means to exchange data between the application and an object embodying the task class. Thus, for example, a task class object may provide linked application data 1130 on how to initialize the application based on a task. Further, this link may also allow data to be surfaced, or communicated, from the application to the task class object, so that, for example, changes to data shown in an application may be communicated back to the task class object and updated in the task class object parameter set.

In the Generate A Proposal example, an application that may be associated with creating a proposal is MS Word. A set of parameters for linking this application may include such information as application location, application execution name, and a set of instructions for instantiating MS Word to open a particular template for creating a proposal and populating fields of the template with information from the business task class. Also, as a user is making changes to information in the MS Word document corresponding to attributes stored in a task class object, data may be communicated back to the object thereby updating the object attributes to reflect changes in the MS Word document. When a document related application such as MS Word is associated with a task class object, an information index, or a set of attributes for tracking changes in a document, may be contained in the task class object.

Figure 12:
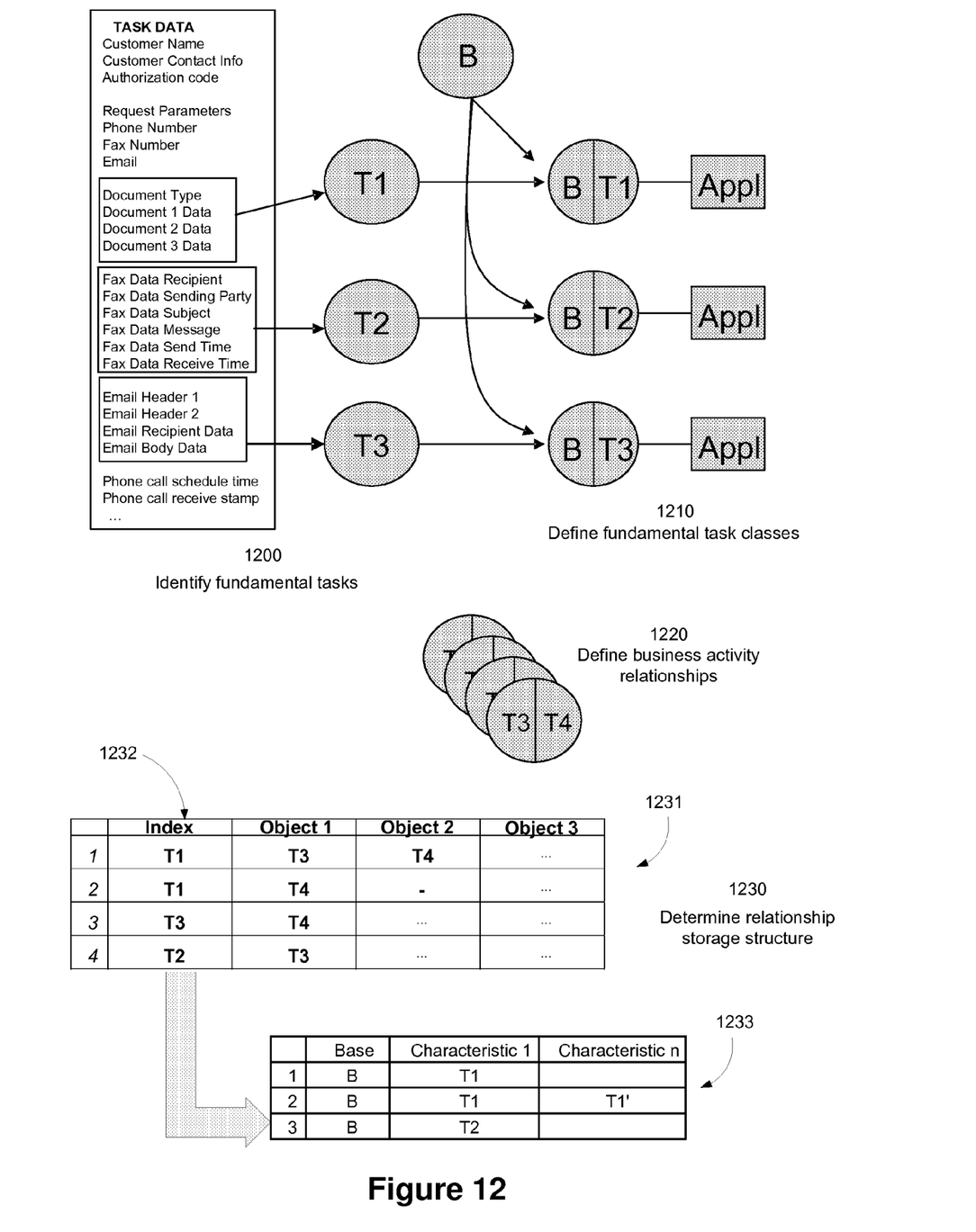
FIG. 12 illustrates an general process diagram for an embodiment of the present invention.

FIG. 12 is an overall flow diagram illustrating the general process for one embodiment of the present invention. At block 1200, a set of fundamental tasks in an existing fixed entity data structure may be identified, and at block 1210, a set of fundamental task classes corresponding to the fundamental tasks may be defined, using base task classes and characteristic task objects. At block 1210, a set of the fundamental task classes may be associated with their respective applications. At block 1220, business activities may be defined by associating different fundamental task classes thereby forming a set of fundamental business activity classes. At block 1230, a mechanism for storing the relationship structure from block 1220 may be illustrated. Table 1231 illustrates a table capturing the associations between business activities and fundamental class objects using an index object 1232. Table 1233 illustrates a table capturing the composition of a fundamental task as an association of a base task class and a task characteristic class. It should be emphasized that while block 1200 illustrates designating specific portions of an existing fixed entity data structure for use as a set of fundamental tasks, block 1200 may also start with a completely new definition of fundamental tasks without consideration of an existing structure. Additionally, while block 1230 illustrates using a database table to capture the relationship structure disclosed in block 1220, as discussed above, the relationship structure may also be captured using link or association parameters and/or inheritance.

By organizing task data using the data models of the present invention, task data may be more efficiently managed. As structures may be tailored to the size of the specific task data being stored, e.g., the size of data used for each individual task, there may be less wasted memory space. Moreover, because the task data may be organized into units which may be associated with other units to create more complex structures, and because these complex structures can be associated with various task views, any particular view of data may be efficiently constructed from base units instead of using valuable process time manipulating an extremely large, static data structure such as those used in the prior art. Views and task definitions may be created ad hoc, even during runtime, because any view may be constructed by combining a set of fundamental tasks and any task may be constructed by combing a base class with a set of characteristic classes. Furthermore, because the task model may be further defined using task class associations to particular applications, further functionality and flexibility may be achieved by allowing data exchange between objects defined by the task class and business class and an application.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments may be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method or orgainizing business task data on a computer-implemented customer relationship management (CMR) system, the method comprising:

creating in the CRM system memory a base task object comprising a set of base parameters;

creating a set of task objects representing a set of business tasks assigned to a user of the CRM system, wherein each task object includes a common base task object and a set of parameters associated with the business task;

forming a plurality of business activity objects, wherein each business activity object is an association of two or more task objects;

associating a task object of the set of task objects with a system application, wherein associating the task object with the system application comprises modifying the task object to include a parameter that is a link to the system application and further wherein the link enables the system application to communicate with the task object;

designating a first task object of the plurality of business activity objects as a first index task object and defining a first set of business activity objects having the same first index task object as a first business activity;

retrieving the first set of business activity object based on the first index task object;

designating a second task object of the plurality of business activity objects as a second index task object and defining a second set of business activity objects having the same second index task object as a business activity, wherein the first and second set of business activity objects include a set of common business activity objects; and retrieving the second set of business activity objects based on the second index task object.

2. The method of claim 1, wherein the method further comprises creating a table for storing the parameters of the set of task objects.

3. The method of claim 2, wherein the table for storing the parameters of the set of task objects comprises merging a set of tables of a base task class and a characteristic class.

4. The method of claim 1, wherein the application is an application for creating documents and further wherein the link enables the customer relationship management system to create an information index of content associated with the documents.

5. The method of claim 1, further comprising querying for business activity objects based on associations to the index task object.

6. The method of claim 1, further comprising modifying a first task object of the set of task objects by associating a second task object to the base task object of the first task object.

7. A computing appartus, comprising:

a display unit that generates video images;

an input device;

a processing apparatus operatively coupled to said display unit and input device, said processing apparatus comprising a processor and a memory operatively coupled to said processor;

a network interface connected to a network and to the processing apparatus, said processing apparatus being programmed to:

creating a base task object comprising a set of base parameter;

form a set of task objects, each task object associated with a business task to be performed by a user of a customer relationshiop management system; wherein each task object includes a common base task object and a set of parameters associated with the business task; and form a plurality of business activity objects, wherein each business activity object is an association of two or more task objects;

associating a task object of the set of task objects with a system application, wherein associating the task object with the system application comprises modifying the task object to include a parameter that is a link to the system application and further wrein the link enables the system application to communicate with task object;

designating a first task object of the plurality of business activity objects as an index task object and defining a first set of business activity objects having the same first index task object as a first business activity;

retrieving the first set of business activity objects based on the first index task object;

designating a second task object of the plurality of business activity objects as a second task object and defining a second set of business activity objects having the same second index task object as a business activity, wherein the first and second set of business activity objects include a set of common business activity objects; and retrieving the second set of business activity objects based on the second index task object.

8. The computing apparatus of claim 7, wherein each task object comprises a base task object and a task characteristic object, and further wherein the base task object comprises parameters common to each task object of the set of task objects and a set of parameters associated with the business task.

9. The computing apparatus of claim 7, wherein a set of parameters of the fundamental task object includes a path to an executable program associated with the business task.

10. The computing apparatus of claim 7, wherein a set of parameters of the business activity object includes a path to an executable program associated with the business activity.

11. The computing apparatus of claim 10, wherein the path comprises data required to execute the executable program in a manner directed by the business activity object.

12. The computing apparatus of claim 7, wherein the task objects and the business activity objects are represented by database tables and wherein parameters of the task objects and business objects are represented by database table fields.

13. The computing apparatus of claim 7, wherein the task objects are superclasses and the business activity object is a subclass of at least two task objects and inherits the parameters of the at least two task objects.

14. The computing apparatus of claim 7, wherein the business activity objects are formed by associating at least two task objects via relationship parameters.

15. The computing apparatus of claim 14, wherein the relationship parameters are contained in the task object.

16. A computer readable storage medium coupled to a processor and having computer-executable instructions for execution by the processor for performing steps comprising:

creating a base task object comprising a set of base parameters:

forming a set of task objects representing a set of business tasks to be performed by a user of a customer relationship management system, each task object of the set of task objects comprising a common base task object and a set of parameters associated with the business task and a set of parameters required to execute a business task;

associating a task object of the set of task objects with a system application, wherein associating the task object with the system application comprises modifying the task object to include a parameter that is a link to the system application and further wherein the link enables the system application to communicate with the task object;

designating a first task object of the set of task objects as a first index task object, the first index task object comprising a fundamental set of parameters required to execute a first business activity, wherein the first business activity includes a first set of business tasks;

designating a second task object of the set of task objects as a second index task object, the second index task object comprising a fundamental set of parameters required to execute a second business activity, wherein the second business activity includes a second set of business tasks;

forming a first set of business activity objects defining the first business activity by associating the first index task object with one or more task objects, wherein each business activity object comprises the fundamental set of parameters of the first index task object and a set of parameters of the associated set of task objects;

forming a second set of business activity objects defining the second business activity by associating the second index task object with one or more task objects, wherein each business activity object comprises the fundamental set of parameters of the second index task object and a set of parameters of the associated set of task objects; and creating a first view of the first business activity by retrieving all business activity objects having associations with the first index task object and creating a second view of the second business activity by retrieving all business activity objects having associations with the second index task object, wherein the first and second view contain common business activity objects.

* * * * *